May 10, 1938.  C. BREER ET AL  2,117,141
VEHICLE ELECTRIC POWER SUPPLY SYSTEM
Filed July 12, 1934
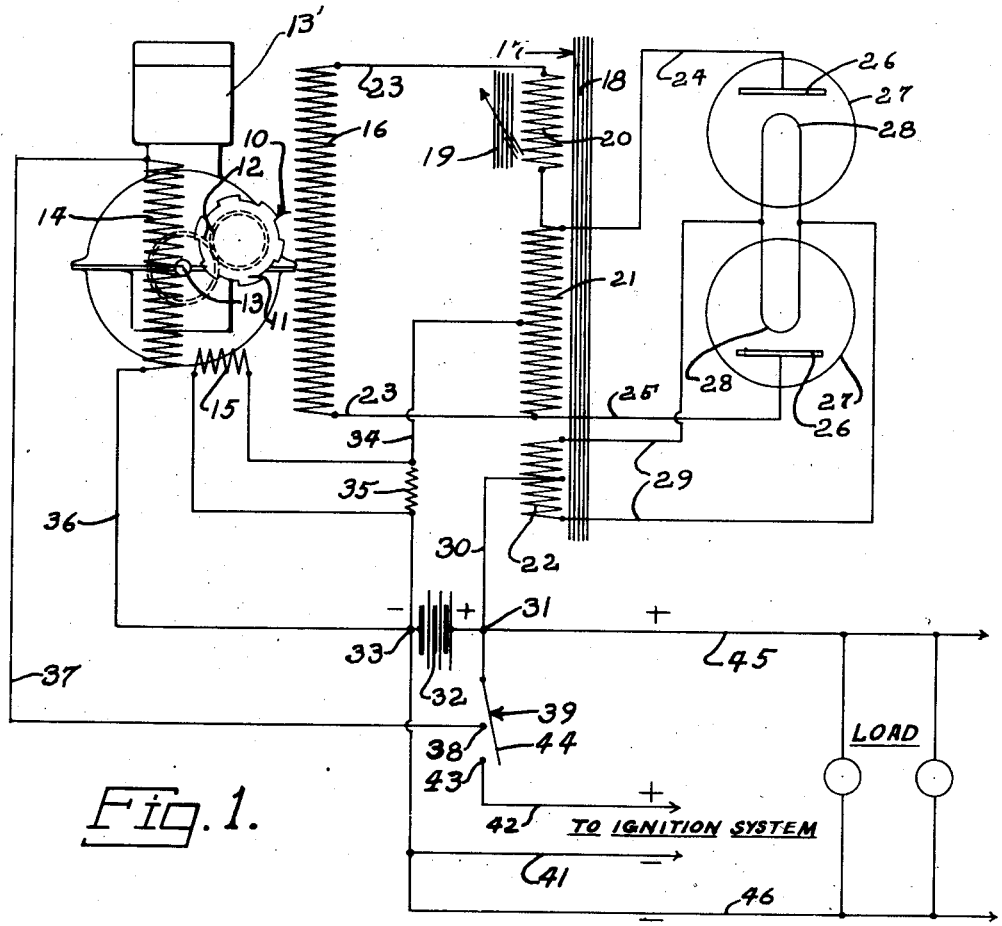
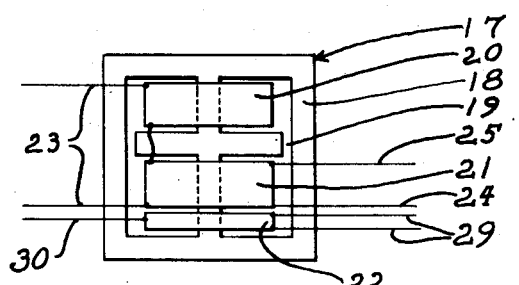
INVENTOR
CARL BREER
GILBERT C. GOODE AND
BY VERNON W. SHERMAN.
ATTORNEY Patented May 10, 1938

2,117,141

UNITED STATES PATENT OFFICE 2,117,141

VEHICLE ELECTRIC POWER SUPPLY SYSTEM

Carl Breer, Grosse Pointe Park, Gilbert C. Goode, Birmingham, and Vernon W. Sherman, Detroit, Mich., assignors, by mesne assignments, of one-half to Chrysler Corporation, Detroit, Mich., a corporation of Delaware, and one-half to Westinghouse Electric & Manufacturing Company, East Pittsburgh, Pa., a corporation of Pennsylvania Application July 12, 1934, Serial No. 734,808

3 Claims. (Cl. 171—313)

This invention relates to an improved electric power supply system for vehicles.

More specifically, the invention provides an electric power supply system having a direct current output of suitable uniformity and characteristics for vehicle battery charging, ignition and lighting purposes under operating conditions that vary, as to speed, throughout a range comparable to the normal operating range of the vehicle engine and in which all of the advantages of alternating current generator performance are obtained.

One of the main objects of the invention is to provide a vehicle electric power supply system which is free from the objectionable features of conventional direct current generators, such as commutator and brush assembly troubles, third brush characteristics of decreasing output at high vehicle speeds, mechanical type voltage and current regulation, and the current conducting problems resulting from the generation of relatively high current at conventional low voltage.

Another object of the invention is to provide automatic regulation of the characteristics of a vehicle electric power supply system by a transformer and without the aid of apparatus having moving parts such as make and break contact members which, in practice, require frequent adjustment and replacement.

Other objects of the invention are to provide in a vehicle electric power supply system an inductor type generator having a solid output circuit which is uninterrupted by brushes or commutating mechanism of any kind and which, therefore, has a substantially fixed resistance; to provide a self-regulating auto-transformer having a magnetic shunt in an electric power supply system of this kind and in combination with an inductor generator so as to obviate the introduction of varying resistances and varying circuit characteristics in the direct current portions of the circuit during operation of the generator within a comparatively wide range of speeds; to provide a bucking coil in the generator field which may, if desired, be used in conjunction with the magnetic shunt of the transformer to maintain the output voltage of the system within a predetermined range; to provide a circuit having therein a generator and transformer of these kinds in which the reactance of both is additive and directly proportional to speed of operation and therefore tends to oppose an increase in the transformer secondary voltage which would normally result from an increase in the speed of the operation of the generator; to provide thermo-ionic current rectifying apparatus which has filaments energized directly from the transformer in such a manner that during the commencement of operation of the system, the filament circuit constitutes the only load on the transformer and the voltage of such circuit rises rapidly to insure quick heating and practically immediate operation of the current rectifying apparatus; to provide a rectifying tube filament circuit of this character in which the current is immediately reduced after normal operation has started, automatically by the increase in the load reflected in the primary circuit of the transformer as the load on the secondary circuit thereof is increased by the passage of current through the rectifying tubes; to provide a rectifying tube filament circuit of this type in which the filament current is further reduced by the operation of the magnetic shunt which takes place as the reflected load on the primary is increased so that the rectifying tube or tubes will be maintained at an operating temperature mainly by the flow of the direct current load through the rectifying apparatus; to provide a pair of thermo-ionic rectifying tubes which are connected together in such a manner that one tube will continue to function in the event that the other tube burns out or otherwise becomes inoperative; and to provide rectifying means of this character which prevent the reverse flow of current from the battery when the generator voltage is decreased by reduction in the generator speed below that value which is required to assure the flow of current to the battery, thereby eliminating the requirement of cutout mechanism.

A further object of the invention is to provide in a vehicle electric power supply system of this character, a separate generator field exciting circuit, which is so controlled by the conventional ignition switch mechanism of a vehicle ignition system as to be energized simultaneously therewith.

A still further object of the invention is to eliminate all unshielded spark producing apparatus of the type which create disturbances in vehicle radios.

An illustrative embodiment of the invention is shown in the accompanying drawing, in which:

Fig. 1 is a schematic illustrational view showing a wire diagram of a vehicle electric power supply system embodying the invention.

Fig. 2 is a diagrammatic side elevational view of the transformer illustrated in Fig. 1.

In the form shown, the improved electric power supply system includes an alternating current inductor type generator 10 having a rotor 11 driven by suitable gearing 12, which is operatively connected directly or indirectly with a crank shaft 13 of an internal combustion engine of a vehicle. The generator 10 has a separately excited field comprising a field coil 14 and it is provided with a bucking coil 15 by which voltage may be maintained within predetermined limits during varying operating speeds of the engine and generator. An alternating current armature winding 16, provided in the stator of generator 10, is connected with a self-regulating auto-transformer 17. The transformer 17, illustrated in Fig. 2, includes a core 18 and is provided with a magnetic shunt having an air gap 19. A magnetic shunt winding 20 and a combined secondary and primary winding 21 as well as an auxiliary secondary winding 22 are provided on the transformer core 18. The magnetic shunt winding 20 and the winding 21 are connected in series and together constitute the primary winding of the transformer which is connected with the armature winding 16 of the generator by conductors 23, the conductors 23, windings 20 and 21 and armature winding 16 constituting the primary circuit of the transformer.

The winding 21 also serves as the main secondary winding of the transformer and it is connected with current rectifying apparatus by conductors 24 and 25 which together with the winding 21 constitute the main secondary transformer circuit. Each conductor 24 and 25 is connected with a plate 26 of one of a pair of thermo-ionic rectifying tubes 27, respectively, and the tubes have filaments 28 connected in parallel. Operation of the tubes is started by initially heating the filaments 28 with current induced in the auxiliary secondary winding 22 and supplied to the filaments by conductors 29.

The direct current discharge from the rectifying apparatus is conducted by the conductors 29 to the auxiliary secondary winding 22 from which it is further conducted by a conductor 30 to the positive terminal 31 of a conventional storage battery 32. The negative terminal 33 of the storage battery is electrically connected by a conductor 34, having a resistance 35 in series therewith, to the center tap of the transformer winding 21 with which the plates 26 of both rectifying tubes are in turn electrically connected. One terminal of the field winding 14 of the generator 10 is connected by a conductor 36 with the negative terminal of the battery 32 and the other terminal of the field winding is connected by a conductor 37 with one terminal 38 of a combined ignition and field circuit switch 39.

The voltage drop across the resistance 35 in the conductor 34 is proportional to the output of the system and is relied upon to excite the bucking coil 15 which is constructed and arranged to oppose the magnetic flux produced by the field winding 14. By properly predetermining the resistance 35 and the bucking coil winding 15 it is possible to rely upon this device to maintain the current output of the generator within predetermined limits and it may also be used to advantage in conjunction with the regulating action of the magnetic shunt 19 of the transformer. Either of these devices may, if desired, be independently relied upon to maintain the characteristics of the output of the system constant within predetermined limits, but it is preferred that both regulating devices be used in conjunction with each other.

The ignition system (not shown) of the internal combustion engine may be supplied with current directly from the battery 32 by the conductors 41 and 42, the conductor 41 being connected directly to the negative terminal 33 of the battery and the conductor 42 being connected with the positive terminal 31 of the battery through the combined ignition circuit and field exciting circuit switch 39. The conductor 42 is directly connected with a terminal 43 of the switch 39 and the latter terminal, as well as the switch terminal 38 are adapted to be simultaneously contacted by a switch lever or other similar member 44 so as to simultaneously close and open the circuit of the ignition system and the field exciting circuit. The battery load comprising the vehicle lighting system, starting system and any other electrical equipment with which the vehicle is provided, is supplied with current by conductors 45 and 46 connected with the positive and negative terminals 31 and 33 of the battery respectively.

In operation of the improved electric power supply system, the switch 39 is closed at all times during operation of the engine and, therefore, the ignition circuit as well as the field exciting circuit of the generator are also closed under these conditions. The alternating current developed by the generator, which preferably has an average of about 300 cycles per second, is supplied directly to the primary side of the transformer and until the filaments 28 of the rectifying tubes have become heated, the auxiliary secondary coil 22 constitutes substantially the only load on the transformer and, therefore, a voltage is rapidly built up in the circuit formed by the auxiliary secondary winding 22, conductors 29 and filaments 28, and as a result the filaments are rapidly heated to an operative temperature. As soon as this temperature is reached, the rectifying tubes commence to function and the flow of direct current therethrough places a load on the secondary winding of the transformer which in turn produces a load on the primary winding in such a manner as to reduce, by virtue of the I. R. drop and magnetic leakage in the primary circuit, the magnetic flux initially operative on the auxiliary secondary winding 22 and thereby reduce the voltage of the filament circuit. The increased load on the primary winding, of which the magnetic shunt coil 20 is a part, brings the magnetic shunt into operation and thereby reduces the magneto motive force at the portion of the transformer core with which the auxiliary winding 22 is associated and this causes a further reduction in the voltage of the filament circuit. As a result of these two filament circuit controlling factors, the filament circuit is substantially de-energized after the system is in full operation and the required temperature of the filament is maintained by the flow of the load current through the tubes.

When the magnetic flux density of the core 18 of the transformer exceeds a predetermined value due to load and generator operating speed conditions, a portion of the flux normally threading the center leg of the transformer core is diverted across the air gaps 19, thereby diverting the flux from that portion of the core 18 with which the secondary winding 21 and the auxiliary secondary winding 22 are associated and, accordingly, compensating for any voltage augmenting tendency due to increasing of the operating speed of the generator. This regulation is accomplished without interrupting any of the alternating current circuits by arc producing mechanism. By virtue of the inherent construction of the inductor generator, the circuits are not otherwise interrupted by brushes or other commutating means. The rectifying apparatus, which serves as a cutout for preventing the reverse flow of current from the battery, eliminates the necessity of conventional cutout mechanism having make and break contact points. All of these features of the improved electric power supply system assure uniformity in the characteristics of the current supplied to the battery and they eliminate the disturbances in vehicle radios caused by creation of unshielded sparks.

The output circuit is so electrically connected with the winding 21 that energy is first supplied by the portion of the winding on one side of the center tap connected to conductor 34 and then by the portion of this winding on the other side of the center tap. The coil 21 is connected with the load by asymmetrically conducting means which are oppositely connected so that one output winding part supplies current during one half cycle and the other output winding part supplies current during the next half cycle.

It is also to be noted that by reason of the leakage-path 19 provided between the windings 20 and 21, sufficient inductance is afforded to give the generator-and-transformer combination an approximately constant current characteristic.

Although but one specific embodiment of the invention is herein shown and described, it will be understood that various changes in the size, shape, and arrangement of parts may be made without departing from the spirit of our invention, and it is not our intention to limit its scope other than by the terms of the appended claims.

We claim:

1. In a vehicle having a variable speed internal combustion engine and including an electric ignition, battery and lighting system; an electric power supply system comprising an alternating current inductor generator operatively connected with said engine; a self-regulating auto-transformer having a primary circuit including a primary winding and including said generator and having a secondary circuit including a portion of said primary winding which portion also serves as a secondary winding; said transformer being provided with a magnetic shunt so located as to provide a flux leakage path around a predetermined portion only of said primary winding; a bucking field winding in said generator connected with said battery system for cooperating with said magnetic shunt in maintaining the characteristics of the battery charging circuit within predetermined limits during operation of said generator at varying speeds; and current rectifying means interposed between said portion of said primary winding which serves as a secondary winding and said battery system for supplying a charging current to the latter.

2. In a vehicle having a variable speed internal combustion engine and including an electric ignition, battery and lighting system; an electric power supply system comprising an alternating current inductor generator operatively connected with said engine; a self-regulating auto-transformer having a primary circuit including a primary winding and including said generator and having a secondary circuit including a portion of said primary winding which serves as a secondary winding; said transformer being provided with a magnetic shunt so located as to provide a flux leakage path around a predetermined portion only of said primary winding, said flux leakage increasing as the load on that portion of the primary winding which serves as a secondary winding increases and thereby tending to maintain the characteristics of said secondary circuit constant; and current rectifying means interposed between said secondary winding and said battery system for supplying a charging current to the latter.

3. A battery system comprising, in combination, a storage battery a direct-current load-circuit connected thereto, a variable-speed alternating-current generator, a high-reactance transformer so energized from said generator as to effectively interpose, in series therewith, an inductance of sufficient magnitude to give the generator-and-transformer combination an approximately constant current characteristic, said transformer comprising a magnetizable core portion, an input winding means, and an output winding means, said output winding means being in two halves which are closely coupled together, and two asymmetrically conducting means connected between the battery and the two output winding halves, respectively, the asymmetrically conducting means being oppositely connected whereby one output winding half supplies current during one half cycle and the other output winding half supplies current during the next half cycle.

CARL BREER.
GILBERT C. GOODE.
VERNON W. SHERMAN.